Dec. 26, 1950 W. L. SHAFER 2,535,872
SIGNALING SYSTEM
Filed April 25, 1947
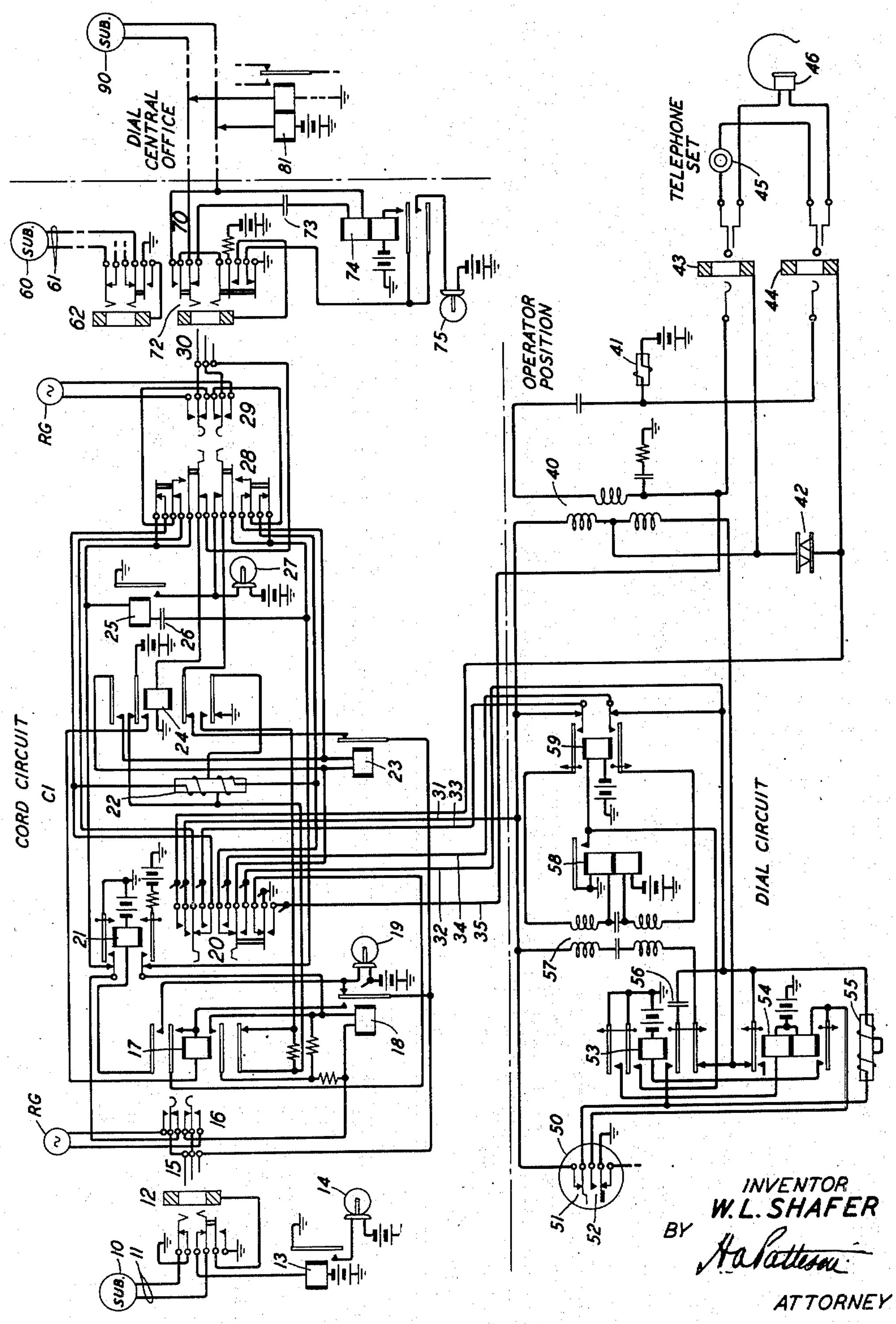
INVENTOR
W. L. SHAFER
BY
[signature]
ATTORNEY Patented Dec. 26, 1950

2,535,872

UNITED STATES PATENT OFFICE 2,535,872

SIGNALING SYSTEM

William Leroy Shafer, Mount Lebanon, Pa., assignor to American Telephone and Telegraph Company, a corporation of New York Application April 25, 1947, Serial No. 743,900

3 Claims. (Cl. 179—16)

This invention relates to signaling systems and particularly to systems in which selective signals are transmitted by the opening and closing of a signaling circuit.

Objects of the invention are a modification of dialing circuits to prevent the transmission of a false impulse at the end of the train created by the impulse contacts of a dial, and in general the improvement of dial impulse transmission where a holding bridge is provided in the dial circuit of an operator's position.

In dialing circuits, such for instance as are provided at manual switchboards for transmitting trains of dial impulses corresponding to the digits of a called subscriber's number, it is usual to provide a supervisory bridge comprising a retardation coil which is connected across the line, over which the dial impulses are to be transmitted, as long as the dial is in normal position. When the dial is moved off normal, it is usual to short-circuit the retardation coil so that the current in the line will increase rapidly each time the impulse contacts of the dial are closed to terminate a dial impulse, thereby to insure the reoperation of the impulse receiving relay which is being controlled by the dial impulses. At the end of each train of impulses, the retardation coil is reconnected across the line; and, due to the increase in the inductance in the loop circuit over the line, there is a momentary reduction in the current which tends to, and frequently does, cause the release of the impulse receiving relay, thereby causing an incorrect switching operation or an incorrect registration of the called subscriber's number. The probability of causing a false release of this impulse receiving relay when the retardation coil is thus reconnected in the impulse transmitting circuit is somewhat reduced by connecting a non-inductive resistor in parallel with the retardation coil at the time that the retardation coil is first reinserted in the impulse transmitting circuit and thereafter opening the path through the resistor. Such an arrangement is disclosed in W. B. Strickler Patent 1,747,849, granted February 18, 1930. However, this method of preventing false switching or registration due to reinsertion of the retardation coil in the impulse transmitting circuit is not fully effective.

This invention is a dialing circuit arrangement in which a retardation coil or other inductive winding is connected in series with the impulse contacts of the dial across a line over which dial impulses are to be transmitted, and in which a very large capacitance is connected in parallel with the inductive winding from the time the dial is moved off-normal until a short interval of time has elapsed after the dial reaches normal.

A feature of the invention is a large capacitative shunt connected across an inductive winding in series with the dial impulse contacts during the transmission of a train of dial impulses to effect a desirable shaping of the dial impulses. Another feature of the invention is a large capacitative shunt connected across an inductive winding which is in series with the dial impulse contacts to stabilize the current level in the impulse circuit at the end of a train of dial impulses and thereby prevent a false release of the impulse receiving relay.

A clear and complete understanding of the invention and its features will be facilitated by the following description of a system embodying the invention as illustrated schematically in the drawing which consists of a single figure. The invention is not limited in its application to the system and specific arrangement shown in the drawing but is generally applicable to systems in which trains of impulses are created by a set of impulse contacts and transmitted in a signaling circuit to control the operation of selective switches or registers.

The system disclosed in the drawing includes a branch exchange and a dial central office. The branch exchange comprises the subscribers' stations 10 and 60 and lines 11 and 61, a cord circuit C1 for use in establishing connections between lines and trunks in the branch office, an operator's position including a dial circuit and telephone set common to a plurality of cords at a position of the switchboard in the branch office, and an outgoing trunk circuit 70. The central office is represented by an impulse receiving relay 81 and a subscriber's station 90. The relay 81 may be the line relay of a first selector to which the trunk from the branch exchange is extended responsive to seizure of the trunk in the branch office; or relay 81 may be the impulse receiving relay of a register which is associated with the trunk responsive to seizure in the branch office.

The subscriber stations 10 and 60 are of the usual type provided in manual, common battery offices. The line circuit associated with line 11 includes a line relay 13 which is operated when the receiver is removed at the station 10 to initiate a call. The operation of relay 13 lights the answering lamp 14 to indicate a call is awaiting attention. When the operator inserts plug 15 of a cord C1 into jack 12 to answer the call, relay 13 is released and lamp 14 thereby extinguished. Relay 18 is operated by the current in the line loop, preventing the lighting of the rear cord supervisory lamp 19; but the front cord supervisory lamp 27 is lighted. With the talking key 20 of cord C1 operated, a conversational connection is established between the calling station 10 and the operator's telephone set. If the call is to another station in the branch exchange, plug 30 is inserted in a jack 62 associated with a called line 61; and ringing key 28 is actuated to transmit ringing current from generator RG over the called line to signal the called station. Sleeve relay 24 remains normal since the sleeve of jack 62 is connected to ground; and the supervisory lamp 27 remains lighted until the call is answered. When the call is answered, relay 23 operates and lamp 27 is extinguished. Supervisory relay 18 remains operated as long as plug 15 is in jack 12 and the receiver is off the hook at station 10. Talking battery is connected to both stations through the windings of retard coil 22. When the calling and called subscribers replace the receivers, supervisory relays 18 and 23 release and lamps 19 and 27 are lighted; whereupon the cord is disconnected from the calling and called subscribers' jacks.

Assume now that the call initiated at station 10 is a call to the station 90 in the central office. In this case the line 11 is extended through jack 12 and plug 15 of cord C1 to the operator set and through plug 30 and jack 72 to an outgoing trunk circuit 70 which terminates at the central office. Relay 24 is operated in a circuit which includes the sleeve conductors of plug 30 and jack 72, thereby to open the battery feed through the retard coil 22, to short-circuit the winding of supervisory relay 23, to extinguish supervisory lamp 27 and to cause the operation of relay 17. The ring-up relay 74 is disconnected from the trunk when the plug 30 is in jack 72; and, as soon as the impulse receiving relay 81 in the central office is connected to the trunk and with key 20 of cord C1 operated, a loop circuit is completed for operating relay 81. This circuit is traced from battery through the left winding of relay 81, lower conductor of the trunk to the branch exchange, a contact of jack 72 and ring conductors of jack 72 and plug 30, a contact of ringing key 29, a back contact of night and through dialing key 26, a front contact of relay 24, a front contact of talking and dialing key 20, conductor 32, retardation coil 55, impulse contacts 51 of dial 50, conductor 31, contacts of keys 20, 28 and 29, tip conductors of plug 30 and jack 72, upper conductor of the trunk to the central office and through the right winding of relay 81 to ground.

Each time a digit of the called subscriber's number is dialed, the off-normal contacts 52 of the dial 50 are actuated thereby closing a circuit for operatively energizing the lower winding of relay 54. Relay 54 disconnects the ring-side of the operator's telephone set from the cord circuit C1 and closes a circuit for operating relay 53. Relay 53 disconnects the ring-side of the operator's telephone set from the repeating coil 57, closes a circuit for energizing the upper winding of relay 54, closes a circuit for operating relay 59 and connects condenser 56 in parallel with the winding of retardation coil 55, thereby preparing the aforementioned loop circuit for the transmission of dial impulses to relay 81. Relay 59 disconnects the tip and ring of the rear plug 15 from the tip and ring of the front plug 30 and connects the tip and ring of the rear cord to the right windings of repeating coil 57 and the windings of relay 58. Relay 58 operates in series with the calling line loop and relay 59 is held operated as long as relay 58 remains operated. When released, the dial returns to normal and the impulse contacts 51 open and close the impulsing circuit as many times as there are units in the digit dialed. Relay 81 releases and reoperates each time the impulsing circuit is opened and closed to effect a corresponding switching operation or digit registration. When the dial reaches normal, relays 53 and 54 release in that order, both of these relays being slow in releasing. Relays 58 and 59 remain operated under control of the talking and dialing key 20 until this key is released.

When dialing is completed and the talking and dialing key 20 is released, relays 58 and 59 release. Relay 17 remains operated in a locking circuit through its inner upper front contact to ground at a back contact of key 20. Talking battery is furnished to the calling station 10 from the central office. When the calling subscriber at station 10 replaces the receiver at the end of conversation, relay 18 releases thereby lighting the supervisory lamp 19 and closing a circuit for operating relay 21. Relay 21 splits the cord to prevent the ringing of station 10 in case the trunk 70 is seized in the central office before the cord C1 is disconnected from jacks 12 and 72. When the plugs are withdrawn, relays 17, 21 and 24 release and lamp 19 is extinguished.

Heretofore it has been usual to connect a resistor in parallel with retardation coil 55 when relay 54 operates and then to short-circuit both the resistor and coil when relay 53 operates, thereby to reduce the inductance and resistance of the impulsing circuit to insure the reoperation of the impulse receiving relay between successive impulses of a digit; and in such an arrangement, the short-circuit across the resistor and coil 55 is opened when relay 53 releases and the resistor shunt across the coil is opened when relay 54 releases thereby minimizing the effect of introducing the coil 55 into the impulsing cirsuit so as to reduce the probability of a false release of the impulse receiving relay at the end of a train of dial impulses. This heretofore employed arrangement was not wholly effective to prevent release of the impulse receiving relay; and, in the arrangement embodying my invention shown in the drawing, a condenser 56 of high capacity, for instance 80 microfarads, is connected in parallel with coil 55 when relay 53 operates in place of short-circuiting coil 55 as in the prior art arrangement. Condenser 56 charges as soon as it is connected in parallel with coil 55; and when the dial is released at the end of the dial wind-up, the first opening of the dial impulse contacts causes the release of relay 81; and while the pulsing circuit is open, condenser 56 discharges through coil 55. When the pulsing circuit is reclosed by the impulse contacts of the dial, condenser 56 again charges and the current through the windings of relay 81 builds up fast to cause the fast reoperation of relay 81, the inductive effect of coil 55 being neutralized due to the fact that the large capacitance of condenser 56 constitutes a very low impedance shunt across the coil 55. Since any rounding of the build-up of the circuit is due solely to the inductance of relay 81 and the capacitance between the line conductors, the shape of the pulse is substantially the same as in prior arrangements which short-circuit the retard coil during the transmission of dial pulses. However, since the retardation coil resistance is included in the pulsing circuit, the maximum current through the winding of relay 81 between pulses is not as large as is the case if the coil 55 were short-circuited; consequently relay 81 releases faster when the pulsing circuit is opened by the dial than would be the case if coil 55 were short-circuited. Thus a pulse shaping is attained which effects fast release of relay 81 each time the pulsing circuit is opened, and fast operation of relay 81 when the pulsing circuit is reclosed. When the impulse contacts of the dial reclose the pulsing circuit at the end of the last pulse of a train, condenser 56 charges and the current in the pulsing circuit builds up the same as at the end of the prior pulses of the train. By the time that relay 53 releases and opens the shunt through condenser 56, the condenser will be substantially fully charged and current through coil 55 stabilized; and consequently any momentary drop in the current through the winding of relay 81, when the shunt is opened, will be insufficient to cause release of relay 81.

What is claimed is:

1. In combination, a circuit including in series a current source, an impulse receiving relay, an inductance and impulse contacts for opening and closing said circuit to transmit impulses to said relay, a capacitance, and means for connecting said capacitance in parallel with said inductance during the transmission of impulses to said relay, said capacitance being large to insure the response of said relay to each impulse of said train and to prevent the false release of said relay when the parallel path through said capacitance is opened at the end of a train of impulses.

2. In combination, a dial impulse sender having impulse contacts and off-normal contacts, a retardation coil connected in series with said impulse contacts, a condenser having a large capacitance, means comprising a slow-to-release relay controlled by said off-normal contacts for connecting said condenser in parallel with said retardation coil while said dial is off normal.

3. In combination, an impulse receiving relay, a dial impulse sender having off-normal contacts and impulse contacts, said impulse contacts connected in a series circuit including a winding of said relay and a source of direct current and being actuated when any digit is dialed to interrupt said circuit during the return movement of said dial as many times as there are units in the digit dialed, a retardation coil connected in said circuit in series with said impulse contacts, a condenser, a relay controlled by the off-normal contacts of the dial, said relay having normally open contacts for connecting said condenser in parallel with said retardation coil, the capacity of said condenser being large and said relay being slow to release whereby sufficient time elapses after the last impulse of a train is transmitted to said impulse relay for the current in said circuit to have reached a substantially steady state before the parallel path through said condenser is opened.

WILLIAM LEROY SHAFER.

REFERENCES CITED

The following references are of record in the file of this patent:

UNITED STATES PATENTS

| Number | Name | Date |
|---|---|---|
| 1,664,665 | Currier et al. | Apr. 3, 1928 |
| 1,747,849 | Strickler | Feb. 18, 1930 |
| 1,864,381 | Trechcinski | June 21, 1932 |
| 1,901,628 | Brainard | Mar. 14, 1933 |
| 1,997,205 | Van Mierlo et al. | Apr. 9, 1935 |
| 2,218,659 | Saville | Oct. 22, 1940 |